US006647493B1

United States Patent
Occhipinti et al.

(10) Patent No.: US 6,647,493 B1
(45) Date of Patent: Nov. 11, 2003

(54) METHOD AND SYSTEM FOR AUTHENTICATION AND ELECTRONIC SIGNATURE

(75) Inventors: Luigi Occhipinti, Ragusa (IT); Giovanni Di Bernardo, Mascalucia (IT); Eusebio Di Cola, Messina (IT); Riccardo Caponetto, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/262,453

(22) Filed: Mar. 4, 1999

(30) Foreign Application Priority Data

Mar. 6, 1998 (EP) .............................................. 98830118

(51) Int. Cl.⁷ .............................. H04L 9/00; H04L 9/30
(52) U.S. Cl. ....................... 713/170; 713/168; 713/169; 380/263
(58) Field of Search ................................ 713/168, 170, 713/169; 380/28, 46, 263, 246, 262, 260

(56) References Cited

U.S. PATENT DOCUMENTS

| 5,048,086 A |   | 9/1991  | Bianco et al. ................. 380/28 |
|---|---|---|---|
| 5,365,589 A | * | 11/1994 | Gutowitz ..................... 380/263 |
| 5,479,513 A | * | 12/1995 | Protopopescu et al. ...... 380/263 |
| 5,696,826 A | * | 12/1997 | Gao ............................ 380/28 |
| 5,841,866 A | * | 11/1998 | Bruwer et al. ............... 713/172 |
| 5,923,760 A | * | 7/1999  | Abarbanel et al. .......... 380/263 |
| 5,930,364 A | * | 7/1999  | Kim ............................ 380/28 |
| 6,018,582 A | * | 1/2000  | Francois et al. ............ 380/256 |
| 6,078,665 A | * | 6/2000  | Anderson et al. ............ 380/28 |
| 6,178,217 B1 | * | 1/2001 | Defries et al. .............. 380/263 |

FOREIGN PATENT DOCUMENTS

JP                09153014            6/1997

OTHER PUBLICATIONS

Hopkins, "Transaction Incrementing Message Authentication Key," *IBM Technical Disclosure Bulletin*, 26 (1):199–201, Jun. 1983.
Walker, "Security in Mobile and Cordless Telecommunications," *Proceedings of the Annual European Computer Conference on Computer Systems and Software Engineering*, pp. 493–496, May 4, 1992.

* cited by examiner

*Primary Examiner*—Gilberto Barron
*Assistant Examiner*—Kambiz Zand
(74) *Attorney, Agent, or Firm*—Lisa K. Jorgenson; E. Russell Tarleton; Seed IP Law Group PLLC (57) ABSTRACT

The method for authentication and electronic signature is of the private-key, challenge and response type between a user requesting an authorization, via, for example, a smart card and a controller—check terminal—supplying the authorization. To increase security of the authorization or authentication operations, the smart card comprises a chaotic generator generating user's acknowledgement code, which is compared with a comparison code generated by the check terminal using a chaotic generator which is the same.

4 Claims, 6 Drawing Sheets

METHOD AND SYSTEM FOR AUTHENTICATION AND ELECTRONIC SIGNATURE

TECHNICAL FIELD

The present invention relates to a method and system for authentication and electronic signature.

BACKGROUND OF THE INVENTION

In the modern theory of cryptographic techniques, a fundamental part is played by systems and methodologies for authentication of the user (sender or recipient), or of the message, and of certification of the authenticity of the data (electronic signature), to protect the exchange of data on channels that are publicly accessible against active attacks aimed at detracting from the integrity of an original message, with the possibility of a non-authorized third party interacting directly with the sender and/or recipient parties. The purpose of these systems is to prevent a communication channel, which is mistakenly thought to be secure, from being used for unplanned or undesirable purposes (undesirable execution of transactions and drawing up of contracts, acts of intimidation, computer piracy or terrorism, or acquisition of selective access data, for example relating to payment).

A problem of this type is all the more serious, the more the mechanism for handling the data can be kept concealed from one party or the other: the extent of the damage caused by an active attack is far greater than that caused by a passive attack, in which the pirate user simply listens to, and deciphers data considered secret, and is transmitted in cryptographic form on a channel.

Furthermore, it has been found in the last few years that by using ever more powerful computing means or distributed computer resources, successful attacks have been made on the most powerful cryptography algorithms now in existence, such as DES, which until a few years ago were considered impossible to "crack".

Within the context of known authentication systems, use is frequently made of "challenge and response" authentication methods that have a private key (secret-type cryptographic algorithm), which is known only to the two parties which want to communicate. In these methods, one of the two parties generates a random number, which is also supplied to the other party, both parties compute independently, and each uses its respective private key and the random number generated, and this code is then compared with the code calculated by the other party, to verify the authorization and access to specific resources and/or to authenticate a message sent with the acknowledgement code.

As is known, in an authentication system of this type, the security of the system itself, i.e., the probability of a pirate user finding the key that opens the entire system, once the authentication system is known to everyone, is associated with the following factors:

(1) secrecy of the key;

(2) statistical incidence of the key in the coded message, i.e., to what extent the statistical distribution of the symbols in the key can detract from the security of the system (this is the case of cryptographic systems in which the user is asked to select the cryptographic key; here there is a high probability that words which make complete sense will be used, with statistical incidence of each symbol that is typical of the language or vocabulary used, to the detriment of the security of the algorithm itself and the cryptographic key);

(3) pseudo-random distribution of the symbols in the coded text, i.e., index of coincidence of each symbol that is as small as possible, according to the Friedman test or K-test (the typical case of a cryptographic system which does not comply with this principle, and is therefore easy to attack, is Vigenere's cipher);

(4) statistical recurrence of the maps of correspondence between a text or portion of text written out in full, and the corresponding text in coded form.

SUMMARY OF THE INVENTION

The object of the invention is thus to provide a method of the challenge and response type that has an improved level of security compared with the known methods, as far as the above-described criteria (2)–(4) are concerned.

According to the present invention, a method, an integrated circuit, and a system for authentication and electronic signature are provided, as defined respectively in the claims.

BRIEF DESCRIPTION OF THE INVENTION

For better understanding of the present invention, two preferred embodiments are now described, purely by way of non-limiting example, with reference to the attached drawings, in which.

DETAILED DESCRIPTION OF THE INVENTION

Hereinafter a method and a system are described for authentication and electronic signature of the private-key, challenge and response type between at least two parties, i.e., a user who requests an authorization (for a specific transaction, or for access to particular resources), or who sends an authenticated message, and a controller which supplies the authorization or checks the authenticity of the message received. For example, the user can operate by means of a "smart card", and interact with a check terminal or a remote controller, via an interface terminal. To increase the security of the operations of authorization or authentication, the system described uses a chaotic generator for generation of the user's acknowledgement code or signature.

In this specification, the term "chaotic generator" means a non-linear dynamic circuit with chaotic development, which is extremely sensitive to its initial conditions, such that the signals generated from two initial conditions which are as close as required to one another, tend very quickly to diverge, and over a period of time develop in a manner which is altogether uncorrelated to one another. The development of a chaotic signal resembles a random signal, the value of which at the moment t+Δt is all the more unforeseeable at the moment Δ, the greater Δt. From the statistical point of view also, a chaotic process is by nature a non-stationary, and in particular it is a non-periodic process, such that its frequency content continually changes its distribution ("randomness"). Thereby, the generator of the chaotic signal used for acknowledgement cannot be identified simply by observation of a high number of exchanged acknowledgement signals, even on a public network.

Figure 1:
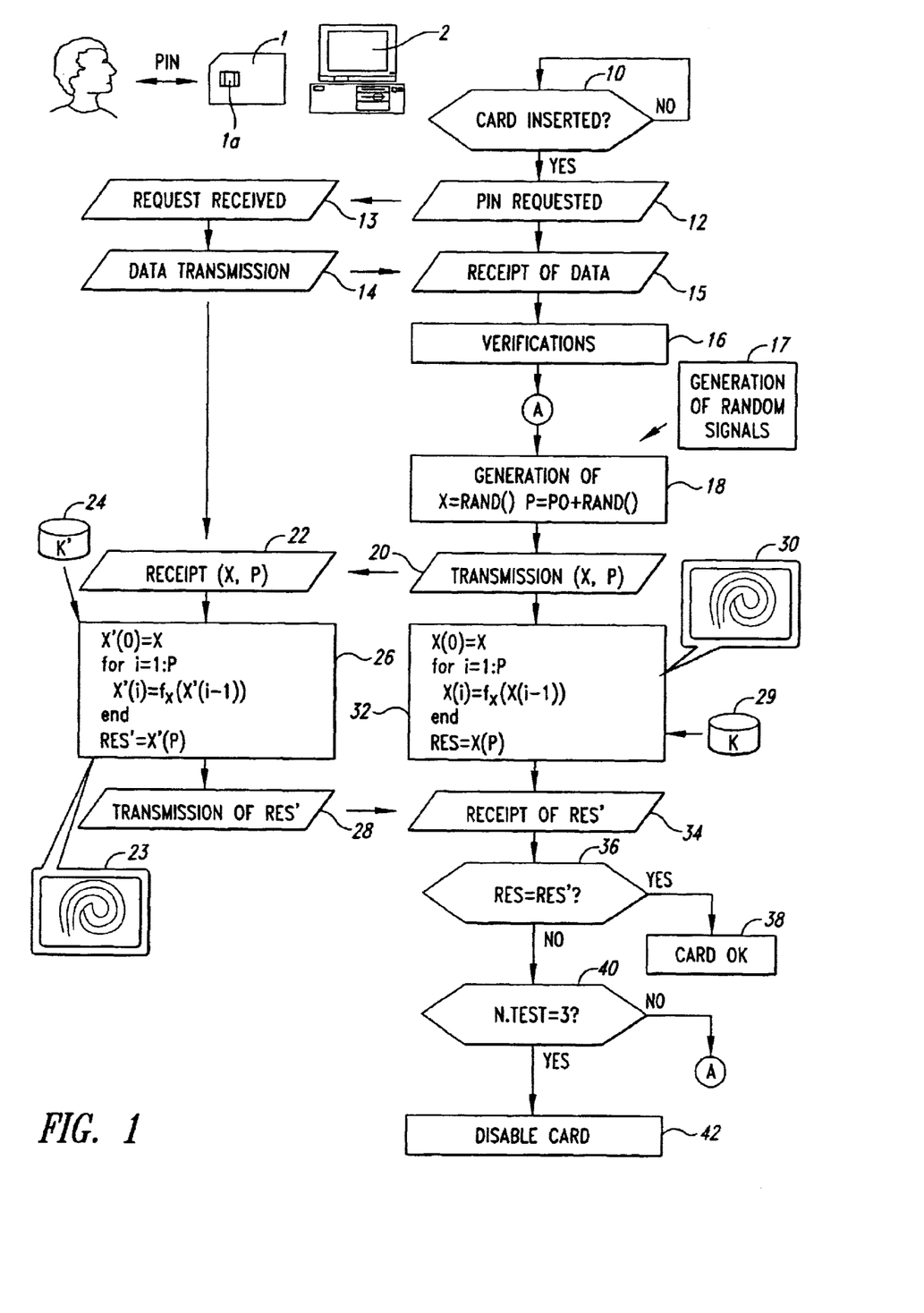
FIG. 1 shows a block diagram relating to a first embodiment of the present method.

FIG. 1 shows the flowchart for the authentication method of a smart card 1 including an integrated circuit 1a to allow access to data and/or resources of a system via a gate comprising a check terminal 2. The card 1 and the check terminal 2 interact via respective input/output means, represented schematically in the Figure by horizontal arrows.

In this embodiment, both the card 1 and the check terminal 2 can generate a chaotic signal internally (in a concealed manner); for this purpose they have a chaotic generator circuit (an embodiment of which will be illustrated hereinafter with reference to FIGS. 5–8) which, on the basis of an initial condition $X_0$ selected randomly in an n-dimensional space, generates an output signal RES. The chaotic generators of card 1 and check terminal 2 can be programmed (in the same manner) through a series of parameters representing the cryptographic key K=K' (private or symmetrical key system).

In particular, with reference to FIG. 1, initially, after the check terminal 2 has detected insertion of a card 1 in an appropriate reading slot (YES output from block 10), it asks card 1 to transmit identification data, including PIN (Personal Identification Number), block 12. When card 1 receives the request (block 13), it transmits this data (block 14). After receipt of the data transmitted by card 1 (block 15) and checking the identification data (for example by asking the user for the PIN and comparing this with the PIN received from card 1) and optionally requesting the type of operations or type of access required by the user, block 16, check terminal 2 generates a signal or initial datum $X_0$ via a random-value generation circuit 17, and also, again using circuit 17, it generates a number P greater than a minimum predetermined value $P_0$ and representing a development time of the chaotic generator, i.e., the number of iterations, in the case of a discrete generator (block 18).

Subsequently, check terminal 2 transmits signals of the initial datum $X_0$ and the development time P, both to card 1 and to its own chaotic generator, block 20. Then, card 1 receives signals $X_0$ and P, block 22, and transfers them to its own chaotic generator 23, which, on the basis of $X_0$ and P, and a secret key K' stored in a location 24 of card 1 itself, calculates an authentication code RES' using a function $f_k(x)$, block 26. Card 1 then transmits authentication code RES' to check terminal 2, block 28.

After transmitting $X_0$ and P, check terminal 2 in turn calculates a comparison code RES using initial datum $X_0$, development time P, and its own secret key K, which is stored in an appropriate location 29, via an own chaotic generator 30, implementing a function $f_k(x)$ which is the same as $f_k(x)$ (block 32). For example, the secret key K used by generator 30 can be selected, on the basis of the received PIN number, from a data base or a memory having several locations, each associated in a known manner with a specific user or group of users, such that the function $f_k(x)$ is different for various users or groups of users. Then, after receiving the authentication code RES' from card 1 (block 34), check terminal 2 compares just calculated comparison code RES with authentication code RES' received from card 1 (block 36); if these codes are equal (YES output from block 36), it accepts the card and supplies an authorization for access or for executing the required operations (block 38); if the codes are not the same (NO output from block 36), it checks whether access has already been attempted three times (block 40); if this is not true (NO output), a further attempt is made, returning to block 18, but if the result is positive (YES output), card 1 is disabled by disabling the PIN identification number (block 42), as already happens for most access control systems.

The above-described method has the following advantages. Firstly, use of chaotic generators with a key allows the user, by means of his card, via the authentication code, to supply a response (or a series of responses), which is completely unpredictable for an external observer from the interrogation which the check system (terminal) generates randomly in the individual cases.

The random variation of the number of discrete instants (development time P) in which the chaotic generator is allowed to evolve ensures that even when the terminal-card system is observed for a sufficiently large number of times, an observer cannot characterize the generator even in statistical form, which, in the case in question, would allow reconstruction of the phase diagram of the generator, by characterizing the specific attractor (although qualitatively).

Figure 2:
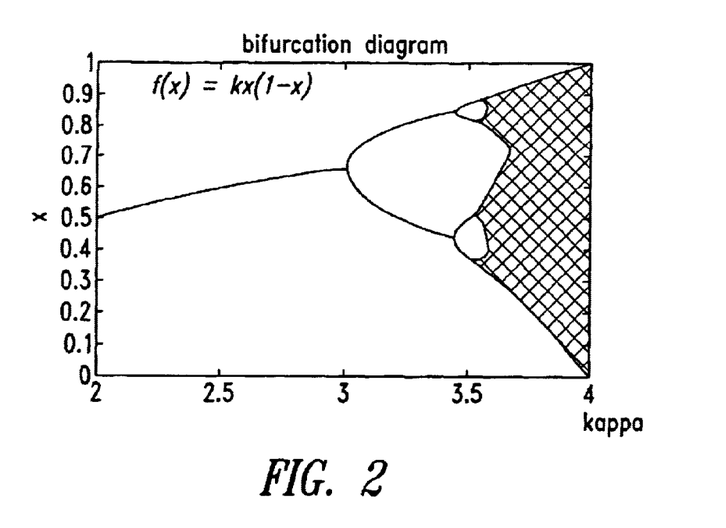
FIG. 2 is a bifurcation diagram for a chaotic generator used according to the method of FIG. 1.

The possibility of generating a (theoretically infinitely) high number of different keys K, by modifying radically the behavior of the dynamic system, can easily be used during construction and parametrisation of the chaotic generator. In fact for this purpose, the infinite number of states characterizing a chaotic generator near a bifurcation is exploited (as shown in FIG. 2 for a chaotic generator which implements the function $f_k(x)=Kx(1-x)$. This possibility is exploited in this specific case by using discrete words of any length, from a continuous-time, non-linear dynamic system, within an appropriate range of parameters that govern the bifurcation. In fact, by virtue of the features of chaotic systems, the continuous-time chaotic system can be discretized starting from two values of the parameters which are infinitely close to one another (i.e., which are distant by 1 less significant bit [LSB], irrespective of the word length). In suitable conditions, designed to avoid cyclicity of the wave forms generated by the discretized system and known to persons skilled in chaotic systems, two chaotic generators with parameters which may even be very similar will produce results which are altogether different from one another when they are allowed to evolve for an appropriate time interval.

The computational complexity of this system depends substantially on the order of the digitalized chaotic generator ($f_k$ function), on the discretization accuracy and on the evolution time interval before giving the response, i.e., on parameters which can be adapted arbitrarily according to the security level to be achieved.

Figure 3A:
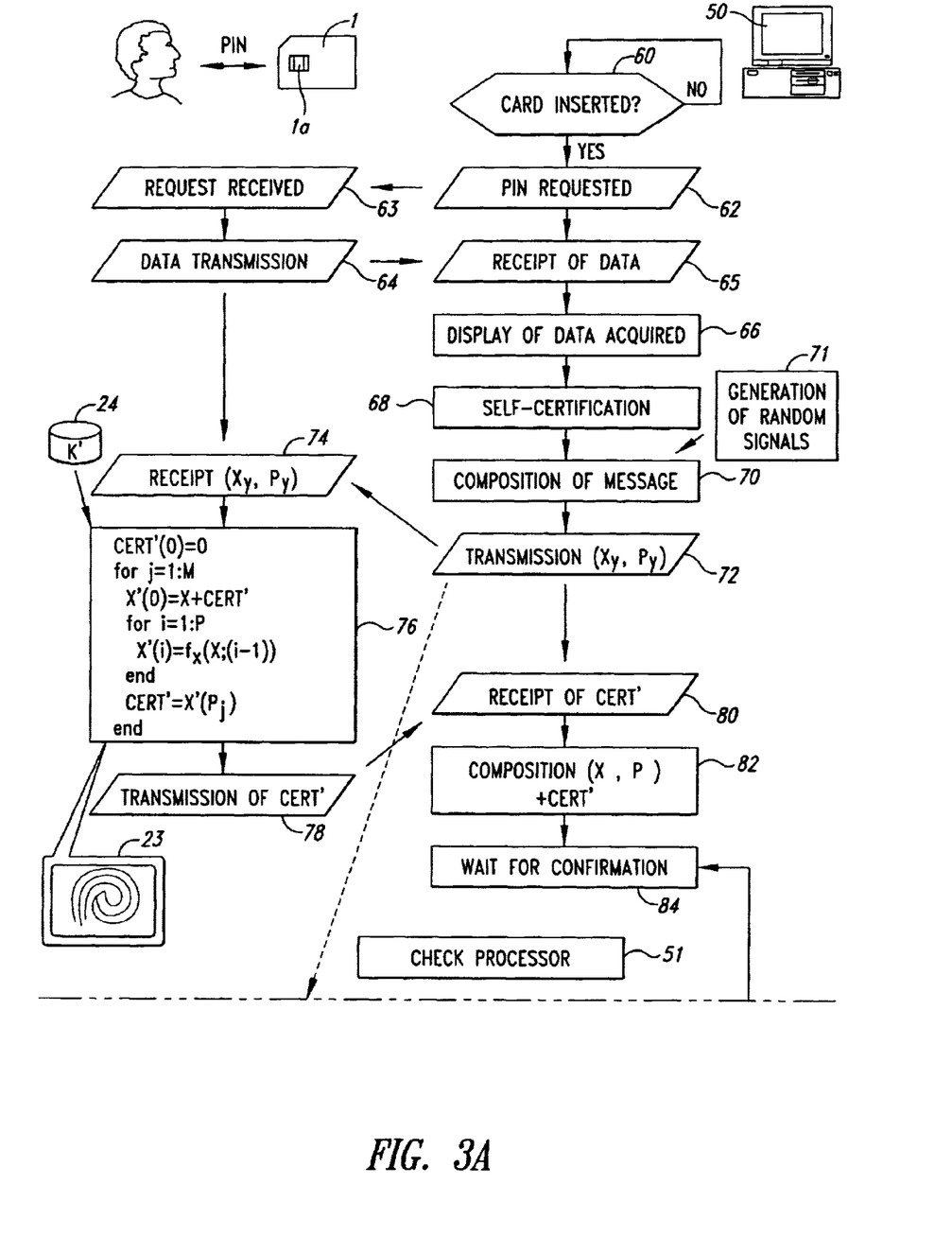
FIGS. 3A and 3B show a block diagram relating to a second embodiment of the present method.
Figure 3B:
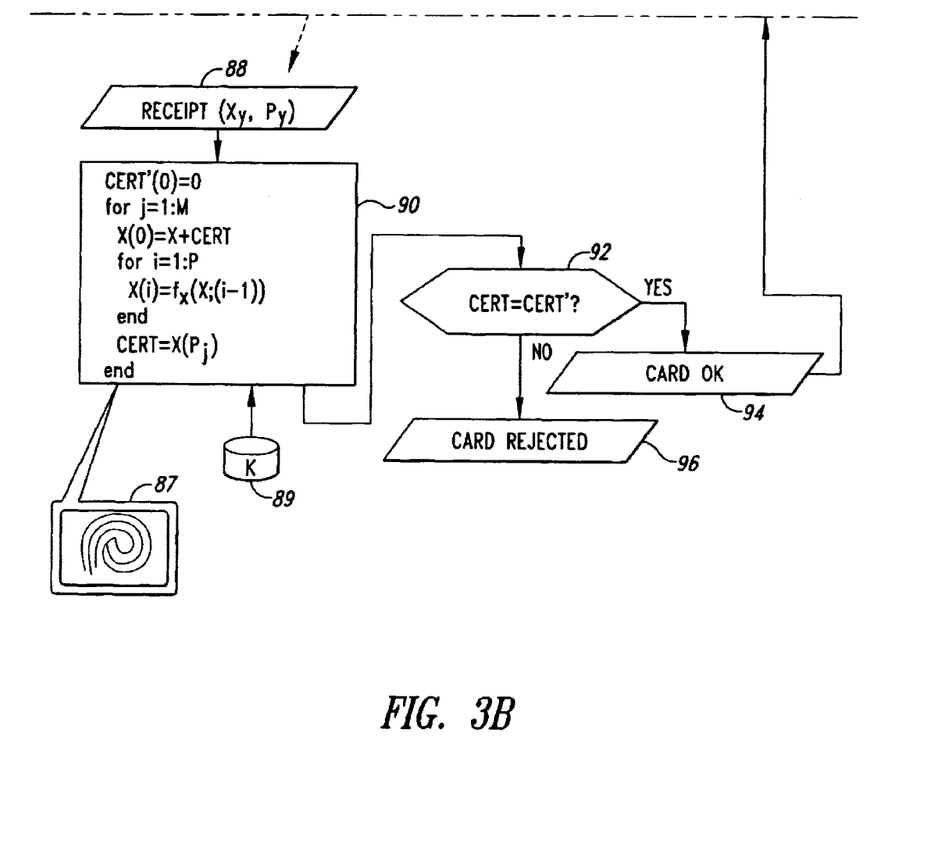

FIGS. 3A and 3B show a second embodiment of the present method, relating to use as a certification and electronic signature method, in the case of a transaction between a user, an interface terminal (which acts as a card reader), and a banking system. In particular, reference is made to a case where the user, holding a card again indicated at 1, must purchase from a generic terminal 50 (with which he interacts by means of respective input/output circuits represented symbolically by oblique arrows) with reference to a banking system represented by a check processor 51 connected to terminal 50 in a known manner (for example by a dedicated line or telephone line, also represented schematically by arrows).

In detail, initially, after terminal 50 has detected insertion of a card 1 in the appropriate reading slot (YES output from block 60), it asks card 1 to transmit the identification data (PIN), block 62. When card 1 receives the request (block 63), it transmits this data (block 64). After receiving the data transmitted by card 1 (block 65), terminal 50 communicates to the user the data relating to the transaction (payment amount), and asks the user to enter the PIN, block 66; as soon as terminal 50 receives the PIN from the user, it compares it with the PIN received from the card 1 for user certification, in a known manner, indicated in the Figure by self-certification block 68. Terminal 50 then composes a message M to be transmitted to check processor 51 (block 70), and to which an electronic signature must be added. In particular, message M comprises identification number of the terminal itself POS_ID, date, payment amount, any predetermined data or information associated with terminal 50, and PIN. The message is associated with a random number generated by a random number generator 71, which number represents the development time of the chaotic generator, i.e., the number of iterations, in the case of a discrete generator. Message M is preferably divided into blocks $X_j$, each accompanied by a respective random number $P_j$. Then, block 72, terminal 50 supplies card 1 with the message blocks ($X_j$, $P_j$).

Figure 4:
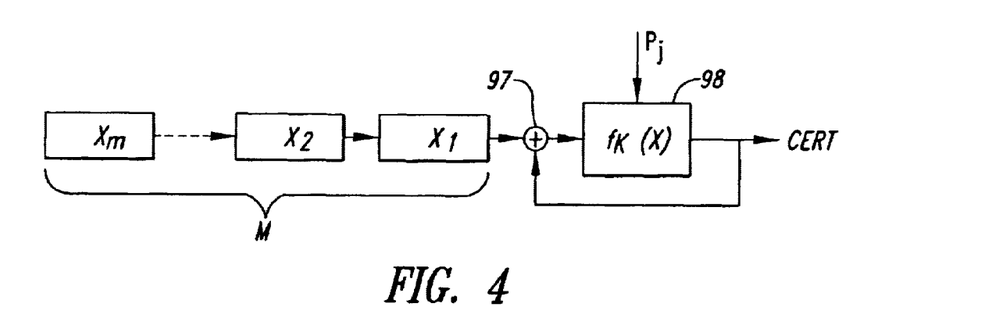
FIG. 4 shows a block diagram relating to the method of FIGS. 3A and 3B.

After receiving blocks $X_j$ and respective random numbers $P_j$, block 74, card 1 transfers them one at a time to its own chaotic generator 23, which, on the basis of a function $f_{k'}(X)$ using a secret key K' stored in location 24 of card 1, on the basis of the preceding calculation result (CERT'), calculates a new result (CERT'), block 76, for each block $X_j$, and carries out $P_j$ iterations, as shown schematically with reference to FIG. 4.

In FIG. 4, message M comprises a plurality of message blocks $X_1, X_2, \ldots, X_m$, supplied in succession to a first input of a node 97 defining an arithmetic operator (for example an EXOR). The output of node 97 is supplied to a generator block 98 including chaotic generator 23, or the chaotic generator associated with check processor 51 and implementing function $f_k(x)$; for each message block M, the respective value $P_j$ is also supplied to generator block 98; the output of generator block 98 thus supplies value CERT, and is connected to a second input of node 97. At each j-th iteration, when a new message block $X_j$ arrives, generator block 98 is then supplied, as an initial value, with the sum of message block $X_j$ and final signal CERT calculated in the previous iteration, and generator block 98 calculates a new value CERT, by applying function $f_k(x)$ for a number of times equal to $P_j$; the final result (after processing of the m-th message block $X_m$) defines the electronic signature.

With reference again to FIGS. 3A and 3B, when all message blocks have been processed, card 1 sends electronic signature CERT' to terminal 50, block 78.

When terminal 50 receives the electronic signature CERT' (block 80), it composes the original message (formed by blocks $X_j$ and respective random numbers $P_j$) with the electronic signature CERT' (block 82), transmits them to check processor 51, and waits for confirmation from check processor 51 (block 84). When it receives the transmitted message (block 88), check processor 51, having an own chaotic generator 87, calculates an authentication signature CERT using blocks $X_j$, respective random numbers $P_j$, and its own secret key K, stored in an appropriate location 89 (block 90). At the end of calculation of the comparison signature CERT, check processor 51 compares just calculated comparison signature CERT with electronic signature CERT' received from terminal 50 (block 92); if the two signatures are equal (YES output from block 92), check processor 51 generates a confirmation message for terminal 50 (block 94), enabling it to accept the transaction; if the signatures are not the same (NO output), check processor 51 rejects the card and sends a corresponding message (block 96).

The above-described method ensures security of all components of the transaction (card 1, terminal 50, and check processor 51).

Here, recourse to chaotic generators is carried out by card 1 and check processor 51, which checks authenticity of the signature with the same criterion adopted for authentication described with reference to FIG. 1, whereas terminal 50 in this case simply acts as an intermediary between user and banking system.

Signature generation from the sent message blocks and the series of time intervals generated by terminal 50 ensures that if the message were corrupted at any point of transmission, the corrupted version would not be recognized, and message itself would be rejected.

Consequently, any fraudulent attempt to modify the message would immediately be revealed and stopped by virtue of lack of correspondence of the message with the electronic signature which accompanies it. In addition, use of a chaotic generator and a private key ensures that the electronic signature can be reconstructed only by the recipient of the message (card management center), for the reasons already illustrated.

Hereinafter, a circuit architecture will be described for implementing the authentication and electronic signature operations, as shown in aforementioned blocks 26 and 76. Similar architecture can be implemented for blocks 32 and 90.

Figure 5:
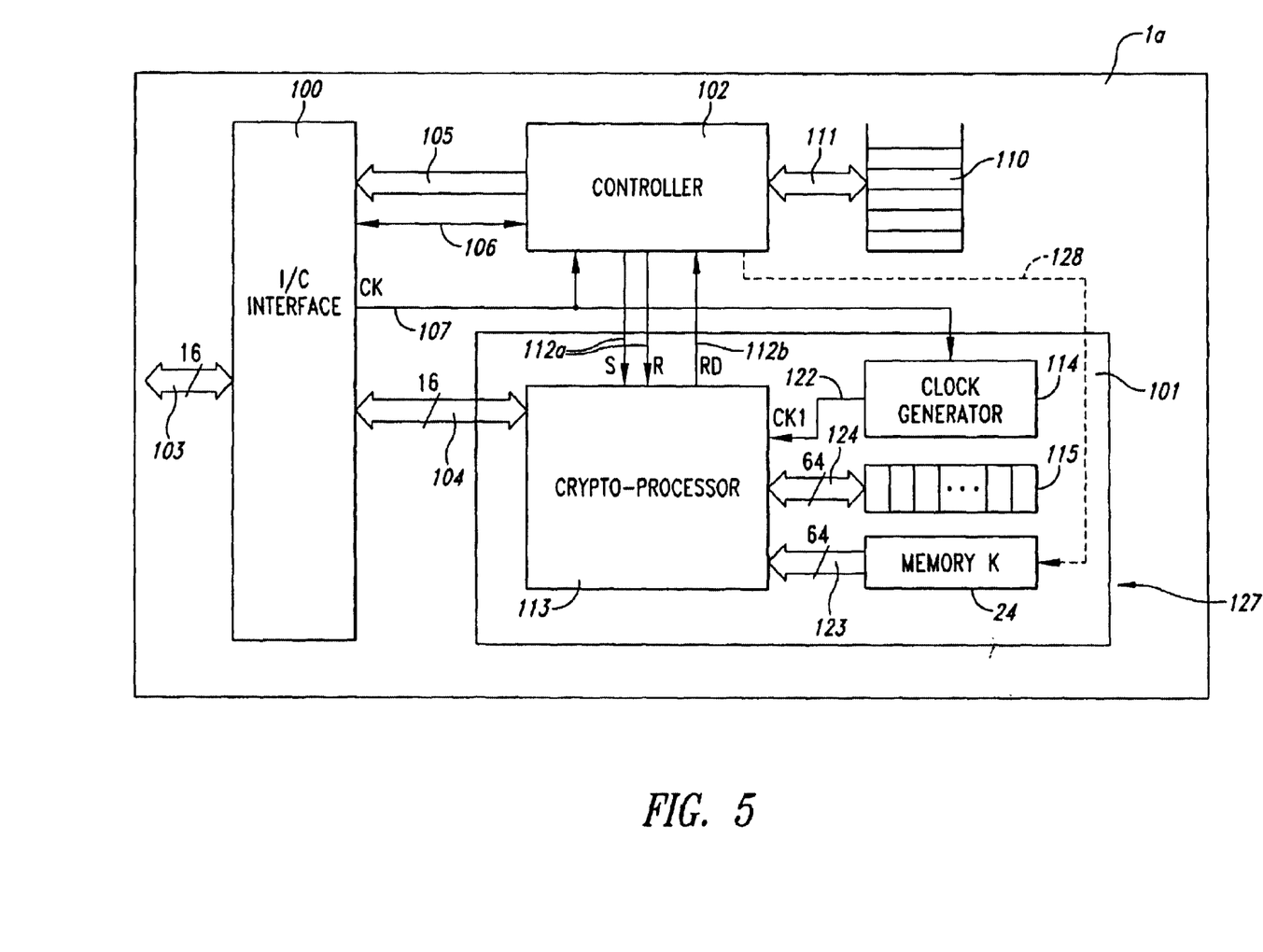
FIG. 5 shows a block diagram relating to circuit architecture for implementation of the present method.

FIG. 5 shows the block diagram implementing an integrated circuit 1a bonded to smart card 1. This diagram is however valid for other implementations in dedicated systems and architectures needing a check of user and data authenticity, for ensuring access security to a specific service, i.e., where it is necessary to verify the integrity of data and information exchanged during for example an electronic transaction operation, by providing a certificate of authenticity forming an electronic signature.

In detail, in FIG. 5, integrated circuit 1a comprises an I/O interface 100 for receiving data from terminal 2 or 50, and transmitting thereto the required data, including PIN and authentication code RES' or electronic signature CERT', as indicated in the Figure by a 16 bit bus 103. The I/O interface 100 is connected to a cryptographic unit 101 via a two-way data bus 104 (receiving the authentication code or the electronic signature), and to a controller 102 via a 16 bit data bus 105 and a line 106, on which instructions are exchanged; a line 107 from the I/O interface 100 also supplies an external clock signal CK to cryptographic unit 101 and to controller 102.

Controller 102 is connected to a memory 110 storing data (including the PIN) of card 1 via a bus 111, and to cryptographic unit 101, for exchange of signals S, R and RD, via lines 112a, 112b.

Cryptographic unit 101 comprises a crypto-processor 113, an internal clock generator 114, a series of registers 115, and storage location 24 for the key K. In detail, internal clock generator 114 receives the external clock signal CK, and generates an internal clock signal CK1 supplied to crypto-processor 113 on a line 122. For example internal clock generator 114 may comprise a frequency multiplier, thereby internal clock signal CK1 has multiple frequency with respect to external clock signal CK. Location 24 (for example comprising 64 non-volatile memory cells and connected to controller 102 via a programming line 128 shown as a broken line), contains the programmable secret key K which is supplied to crypto-processor 113 via a 64 bit bus 123, whereas registers 115 are connected to crypto-processor 113 via a 64 bit bus 124.

Cryptographic unit 101 is located in an area of integrated circuit 1a which is concealed from the exterior, by virtue of a metal layer 127 covering circuit 1a to prevent fraudulent acquisition of stored data and structures by suitable inspection techniques.

The purpose of controller 102 is to manage flow of data between terminal 2, 50 and memory 110, data writing and updating in memory 110, programming of location 24, and to check that the operations carried out by crypto-processor 113 are synchronized with interface 100.

Figure 6:
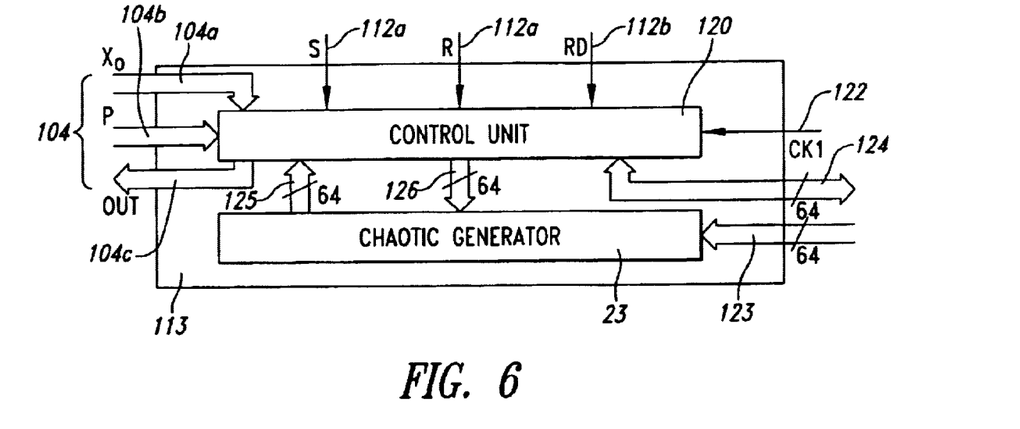
FIG. 6 shows the block diagram of a component of FIG. 5.

FIG. 6 shows a block diagram of crypto-processor 113 in case of the authentication method of FIG. 1, and comprises a control unit 120, preferably formed by a states machine, and chaotic generator 23, implementing function $f_k(x)$. Control unit 120 and chaotic generator 23 communicate via 64 bit buses 125, 126.

Control unit 120 receives start S and reset R signals on lines 112a, signal CK1 on line 122, initial datum $X_0$ on 16-bit line 104a, and iteration number P on 16-bit line 104b, and supplies as output ready signal RD on line 112b and output datum OUT (corresponding to the authentication code) on 16-bit line 104c; lines 104a, 104b and 104c together form bus 104.

Figure 7:
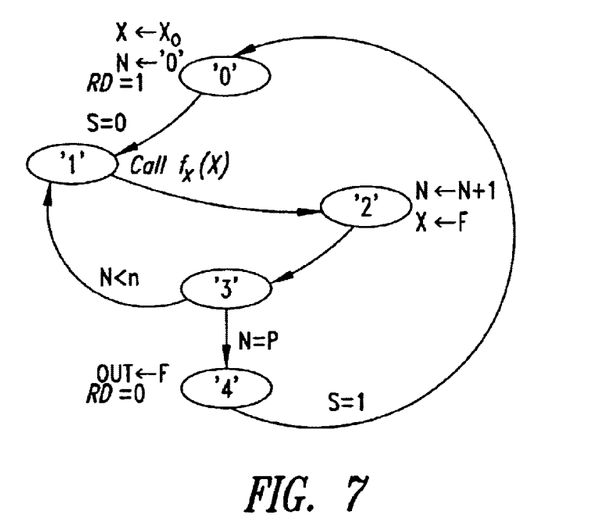
FIG. 7 shows the state diagram of one of the blocks of FIG. 6.

In particular, control unit 120 executes the algorithm shown in states diagrams of FIG. 7, and comprises the following states:

STATE 0: assigns "1" to RD (showing that it is available for a new operation), resets the value of register N (belonging to the group of registers 115 and a representing the number of iterations carried out) and assigns value $X_0$ to register X (belonging to the group of registers 115), after standardization to 64 bits. It then waits for start signal S to be activated, to progress to state 1;

STATE 1: recalls function $f_k(x)$, supplying the value of internal register X, and progresses to state 2;

STATE 2: reads the value generated by function $f_k(x)$ and supplies this value to X, increments the value of internal register N, and progresses to state 3;

STATE 3: if the value of register N is lower than P, it returns to state 1, otherwise it progresses to state 4;

STATE 4: allocates "0" to RD (indicating that it has finished the operation) and supplies the output OUT with value $f_k(x)$, after standardization to 16 bits. It waits until signal S has been deactivated to return to STATE 0; this prevents it from restarting a new process after having terminated the current process.

If the method according to FIGS. 3A and 3B is to be implemented, it will be appreciated that in addition to control unit 120 and chaotic generator 23, the crypto-processor 113 would preferably comprise a unit which activates summation node 97 of FIG. 4, and the algorithm of control unit 120 must be modified such as to comprise the control states of the summation node and of the iteration of the combination of the message blocks (external loop of block 76).

Figure 8:
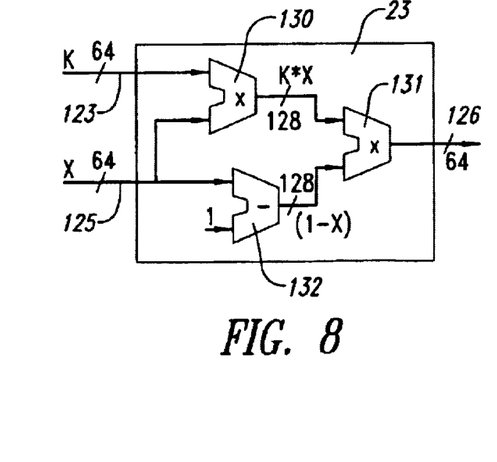
FIG. 8 shows the internal architecture of another block of FIG. 6.

An embodiment of the chaotic generator 23 is shown in FIG. 8, in case the following function is implemented:

$$f_k(x)=K.x.(1-x) \text{ where } 0<x<1 \text{ and } 3<K<4.$$

Chaotic generator 23 comprises a combinatorial logic unit including a first and a second multiplier 130, 131 and a subtractor 132. In detail, first multiplier 130 has two inputs connected to buses 123 and 125, and a (128 bit) output connected to an input of second multiplier 131; subtractor 132 has a first input also connected to bus 125, a second input receiving the value "1" and standardized to 64 bits, and a (128 bit) output connected to the second input of second multiplier 131; the output of second multiplier 131, which has 64 bits, is connected to bus 126.

Figure 9:
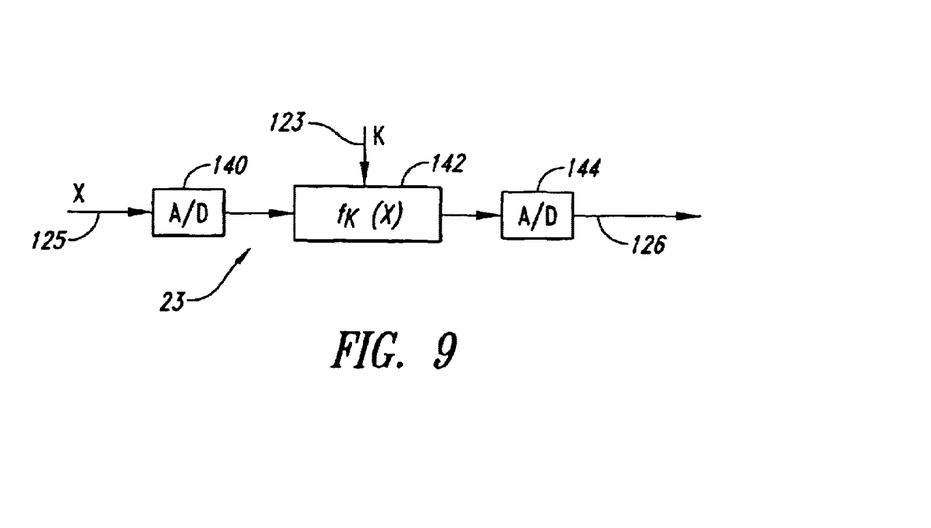
FIG. 9 shows a different embodiment of the block of FIG. 8.

FIG. 9 shows a different embodiment of chaotic generator 23, implementing function $f_k(x)$ in a combined analogue-digital mode. In detail, the circuit of FIG. 9 comprises a digital/analogue converter 140, to the input of which (indicated at 125, by analogy with FIG. 8) there is supplied the initial datum $X_0$ or the result X of the preceding iteration, and the output of which is connected to a non-linear-type analogue circuit 142 which can be programmed digitally (via an input, again indicated as 123) which implements function $f_k(x)$; the output of analogue circuit 142 is connected to an analogue/digital converter 144 supplying at its output (again indicated as 126) the digital value corresponding to the analogue value generated by circuit 142.

In the circuit of FIG. 9, presence at the input and at the output of the initial datum and the result in digital form ensures that a same calculation accuracy level is obtained (to the least significant bit) both by the card 1 and by the check component (terminal 2 or processor 51), and thus ensures generation of the same acknowledgement code, starting from same initial conditions and using a same key.

In general, selection of the embodiment of the circuit implementing the function $f_k(x)$ in a purely digital manner (as in FIG. 8), or with a combined analogue/digital signal (FIG. 9), depends, in the individual cases, on the requirements in terms of circuit complexity, accuracy and sensitivity to process variations. In particular, implementation of function $f_k(x)$ in a purely digital form generally provides a high level of accuracy, and requires greater circuit complexity (owing to the presence of a larger number of transistors to implement the digital multipliers, with a consequent increase in the bulk of the device), compared with the circuit embodiment in hybrid form, shown for example in FIG. 9.

Finally, it is apparent that many modifications and variants can be made to the method and the architecture described and illustrated here, all of which come within the scope of the invention, as defined in the attached claims. For example, besides the described two applications, the present method can be applied to a direct transaction request from a terminal or personal computer, which includes acknowledgement code generation structures (authorization or signature) and message generation structures, similarly to the arrangement described with reference to FIGS. 3A and 3B. In addition, improvements relating to security can be obtained by adopting complex chaos generation functions, with a higher number of parameters which form the key. These characteristics make the system very secure as far as prevention of attacks based on the statistical method are concerned.

What is claimed is:

1. A method for authentication and electronic signature, comprising:

generating a casual initial signal, comprising acquiring a random signal;

generating an authentication and electronic signature signal by using a first private key, the casual initial signal, and a first chaotic signal generator and generating a first chaotic signal by activating the first chaotic signal generator for a development time related to the random signal;

generating a comparison signal by using the casual initial signal, a second private key equal to the first private, and a second chaotic signal generator identical to the first chaotic generator and generating a second chaotic signal; and comparing said authentication and electronic signature signal with said comparison signal.

2. The method according to claim 1 wherein said casual initial signal comprises a message to be transmitted.

3. The method according to claim 1 wherein acquiring a random signal comprises acquiring a plurality of message blocks.

4. A method for authentication and electronic signature, comprising:

generating a casual initial signal, comprising acquiring a respective random signal for a plurality of message blocks, each message block comprising a first message block, a successive message block, and a final message block;

generating an authentication and electronic signature signal by using a first private key, the casual initial signal, and a first chaotic signal generator and generating a first chaotic signal, which further comprises:

a) acquiring the first message block;

b) generating a chaotic output signal from said first message block by activating the first chaotic generator for a development time correlated to the respective random signal;

c) combining said chaotic output signal with the successive message block to obtain a combined block;

d) generating a new chaotic output signal from said combined block by activating the first chaotic generator for a development time correlated to the respective random signal;

e) repeating said steps c) and d) as far as the last message block; and f) supplying said chaotic output signal as the signature of said message;

generating a comparison signal by using the casual initial signal, a second private key equal to the first private key, and a second chaotic signal generator identical to the first chaotic generator and generating a second chaotic signal; and comparing said authentication and electronic signature signal with said comparison signal.

* * * * *

UNITED STATES PATENT AND TRADEMARK OFFICE
CERTIFICATE OF CORRECTION

PATENT NO.     : 6,647,493 B1
DATED          : November 11, 2003
INVENTOR(S)    : Luigi Occhipinti et al.

It is certified that error appears in the above-identified patent and that said Letters Patent is hereby corrected as shown below:

<u>Column 9,</u>
Line 13, "first private," should read as -- first private key, --.

Signed and Sealed this

Thirtieth Day of March, 2004

JON W. DUDAS
*Acting Director of the United States Patent and Trademark Office*